(12) United States Patent
Ray et al.

(10) Patent No.: US 7,764,694 B2
(45) Date of Patent: Jul. 27, 2010

(54) SYSTEM, METHOD, AND APPARATUS FOR PRIORITIZING NETWORK TRAFFIC USING DEEP PACKET INSPECTION (DPI)

(75) Inventors: Amar Nath Ray, Shawnee, KS (US); John M. Heinz, Olathe, KS (US)

(73) Assignee: Embarq Holdings Company, LLP, Overland Park, KS (US)

(*) Notice: Subject to any disclaimer, the term of this patent is extended or adjusted under 35 U.S.C. 154(b) by 168 days.

(21) Appl. No.: 12/044,821

(22) Filed: Mar. 7, 2008

(65) Prior Publication Data

US 2009/0225655 A1 Sep. 10, 2009

(51) Int. Cl.
H04L 12/56 (2006.01)
(52) U.S. Cl. .................................. 370/395.42
(58) Field of Classification Search ........................ None
See application file for complete search history.

(56) References Cited

U.S. PATENT DOCUMENTS

| | | | |
|---|---|---|---|
| 2002/0114327 A1 | 8/2002 | Mononen | |
| 2002/0194342 A1 | 12/2002 | Lu et al. | |
| 2003/0079041 A1* | 4/2003 | Parrella et al. | 709/247 |
| 2004/0198367 A1* | 10/2004 | Kim | 455/452.1 |
| 2004/0267948 A1 | 12/2004 | Oliver et al. | |
| 2006/0187874 A1* | 8/2006 | Zaki | 370/328 |
| 2007/0061433 A1 | 3/2007 | Reynolds et al. | |
| 2007/0121615 A1* | 5/2007 | Weill et al. | 370/389 |
| 2007/0153798 A1* | 7/2007 | Krstulich | 370/392 |
| 2007/0156919 A1* | 7/2007 | Potti et al. | 709/238 |
| 2008/0192632 A1* | 8/2008 | Bader | 370/230.1 |

OTHER PUBLICATIONS

Non-Final Office Action date mailed Oct. 28, 2009 in U.S. Appl. No. 12/052,562 (15 pages).
Internet Engineering Task Force RFC 938; available online at vvww.apps.ietf.org, Feb. 1985 (15 pages).
Tmima Koren et al., "Enhancements to IP/UDP/RTP Header Compression", Mar. 9, 2000 (17 pages).

* cited by examiner

*Primary Examiner*—Chirag G Shah
*Assistant Examiner*—Amarnauth Persaud
(74) *Attorney, Agent, or Firm*—Sonnenschein Nath & Rosenthal LLP

(57) ABSTRACT

A method, system, and apparatus for prioritizing network traffic according to one embodiment includes receiving a packet addressed to a receiver device from a sender device, identifying the packet at a network layer to determine an application and/or protocol associated with the packet, and generating traffic priority information associated with the packet based upon the identification. In at least one embodiment, the traffic priority information indicates traffic prioritization between the sender device and the receiver device. The method further includes forwarding the packet to the receiver device, receiving an acknowledgment packet from the receiving device, and inserting the traffic priority information into the acknowledgment packet at a transport layer. In at least one embodiment, the acknowledgment packet is forwarded to the sender device. In various embodiments, the packet is identified at the network layer using deep packet inspection.

20 Claims, 3 Drawing Sheets

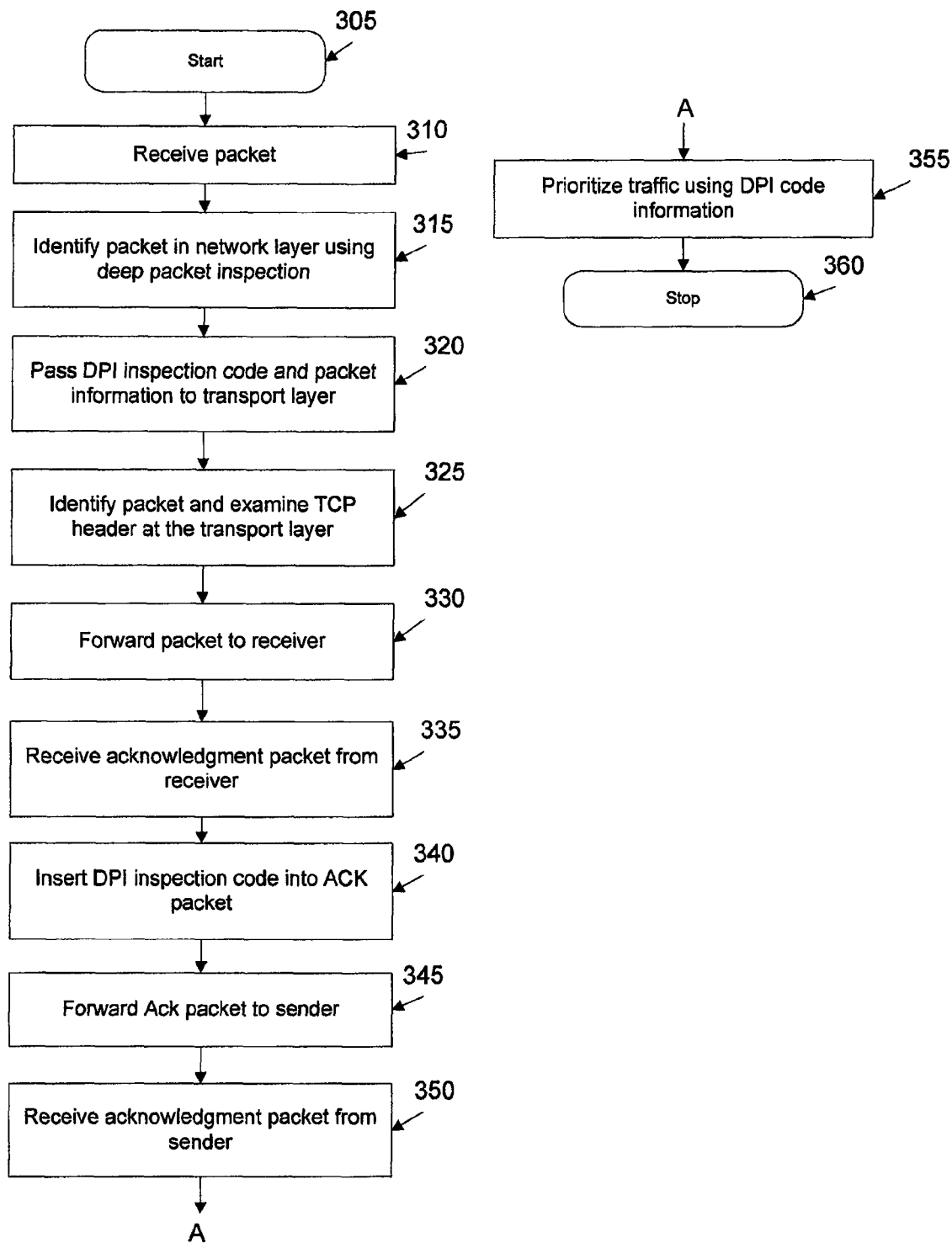

SYSTEM, METHOD, AND APPARATUS FOR PRIORITIZING NETWORK TRAFFIC USING DEEP PACKET INSPECTION (DPI)

BACKGROUND OF THE INVENTION

Deep packet inspection (DPI) is a form of computer network packet filtering that examines a data part of a passing-through packet to search for non-protocol compliance of predefined criteria to decide if the packet can pass through a network. This is in contrast to shallow packet inspection (usually called, just packet inspection) that just checks the header portion of a packet.

DPI devices have the ability to look at Layer 2 through Layer 7 of the OSI model. This includes headers and data protocol structures. The DPI identifies and classifies the traffic based on a signature database and allows a user to perform several functions. A classified packet can be redirected, marked/tagged, blocked, rate limited, and reported to a reporting agent in the network. Some DPI devices also perform the ability to identify flows rather than a packet by packet analysis.

DPI allows service providers to readily know the packets of information that are being received online associated with e-mail, websites, music sharing, video and software downloads in the same or similar manner as a network analysis tool. Up-to-this point in time, DPI has been used for security purposes so that a service provider can identify the applications that are using network resources and take action if an undesired application is present. For example, a service provider may wish to prevent a customer from using peer-to-peer file sharing applications.

SUMMARY OF THE INVENTION

Because many network applications exhibit similar behaviors, it is difficult for a service provider to correctly identify a particular network application and accurately prioritize network traffic in accordance with the identification using existing identification techniques. Embodiments of the invention provide for a system and method for accurately identifying network packets by using deep packet inspection (DPI) to generate deep packet inspection (DPI) information, and using the DPI information to prioritize network traffic. Embodiments of the invention provide for identifying specific network applications and/or protocols associated with a received packet at a network layer using deep packet inspection to generate DPI information, inserting the DPI information into an acknowledgement (ACK) packet at a transport layer, and sending the acknowledgement (ACK) packet, including the DPI information, to one or more of a sender device, a receiver device, and a network controller. The DPI information includes priority information associated with the packet. One or more of the sender, the receiver, and the network control may then prioritize and/or control traffic flowing from the sender device to the receiver device according to the DPI information included in the acknowledgement packet. Various embodiments allow service providers to prioritize traffic on their networks according to a particular network application and/or protocol in use. For example, a service provider may wish to lower the priority of traffic associated with peer-to-peer file sharing applications.

A method for prioritizing network traffic according to one embodiment includes receiving a packet addressed to a receiver device from a sender device, identifying the packet at a network layer to determine an application and/or protocol associated with the packet, and generating traffic priority information associated with the packet based upon the identification. In at least one embodiment, the traffic priority information indicates traffic prioritization between the sender device and the receiver device. The method further includes forwarding the packet to the receiver device, receiving an acknowledgment packet from the receiving device, and inserting the traffic priority information into the acknowledgment packet at a transport layer. In at least one embodiment, the acknowledgment packet is forwarded to the sender device. In various embodiments, the packet is identified at the network layer using deep packet inspection.

An apparatus for prioritizing network traffic according to one embodiment includes processor(s) configured to receive a packet addressed to a receiver device from a sender device, identify the packet at a network layer to determine an application and/or protocol associated with the packet, and generate traffic priority information associated with the packet based upon the identification. The traffic priority information indicates traffic prioritization between the sender device and the receiver device. The processor(s) is further configured to forward the packet to the receiver device, receive an acknowledgment packet from the receiving device, and insert the traffic priority information into the acknowledgment packet at a transport layer. In at least one embodiment, the processor(s) is further configured to forward the acknowledgment packet to the sender device. In various embodiments, the packet may be identified at the network layer using deep packet inspection.

A computer usable program product in a computer readable medium storing computer executable instructions for prioritizing network traffic that, when executed, cause a processor(s) to: receive a packet addressed to a receiver device from a sender device, identify the packet at a network layer to determine an application and/or protocol associated with the packet, and generate priority information associated with the packet based upon the identifying identification. The traffic priority information indicates traffic prioritization between the sender device and the receiver device. The processor(s) is further operable to forward the packet to the receiver device, receive an acknowledgment packet from the receiving device, and insert the traffic priority information into the acknowledgment packet at a transport layer. The processor is further operable to forward the acknowledgment packet to the sender device. In various embodiments, the packet is identified at the network layer using deep packet inspection.

BRIEF DESCRIPTION OF THE DRAWINGS

Illustrative embodiments of the present invention are described in detail below with reference to the attached drawing figures, which are incorporated by reference herein and wherein:

FIG. 3 illustrates an embodiment of a procedure for prioritizing network traffic using deep packet inspection (DPI).

DETAILED DESCRIPTION OF THE INVENTION

Embodiments of the invention provide for a system and method for identifying network packets using deep packet inspection (DPI). In the past, DPI has been thought of as a security issue, but in embodiments of the present invention DPI can be used by a service provider to prioritize traffic on their networks. In various embodiments, the DPI identifying information is passed from the network layer (Layer 3 of the simplified Open Systems Interconnection (OSI) model) to the transport layer (Layer 4 of the simplified OSI model) and delivered to a controller using a Transport Control Protocol (TCP) technique. Embodiments of the invention provide for delivering DPI information to both the sender/receiver and the network controller by first injecting DPI information into the transport layer and then incorporating the DPI information into acknowledgement (ACK) packets used in Transmission Control Protocol (TCP) transport technology. The deep packet inspection information includes priority information associated with a particular network packet. According to various embodiments of the invention, prioritization and traffic shaping can be performed from a source using DPI by sending DPI information to a sender.

Figure 1:
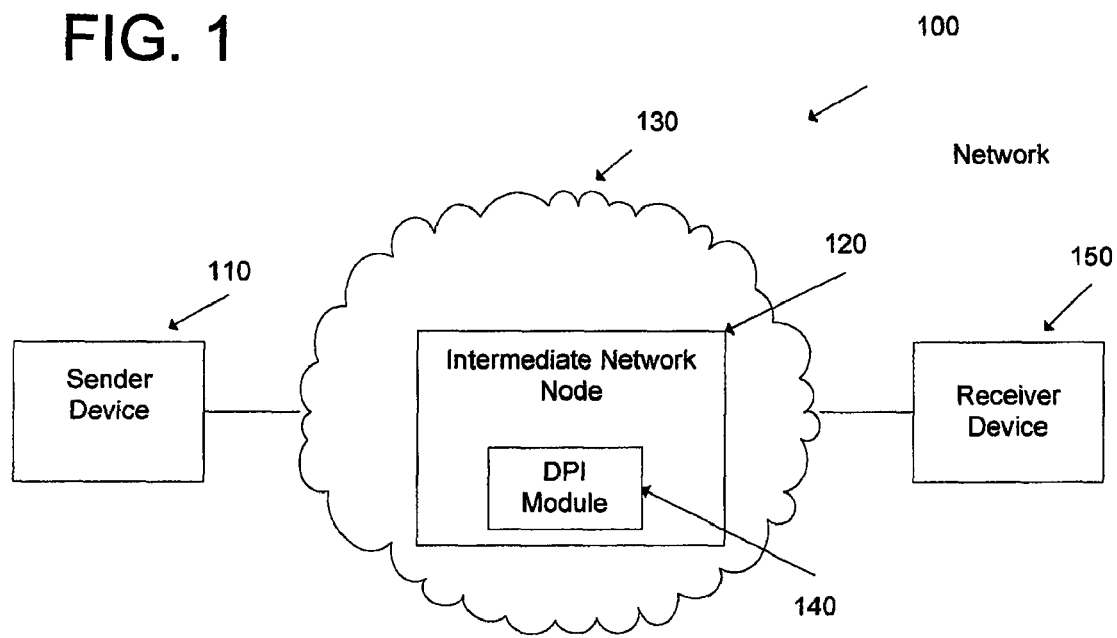
FIG. 1 illustrates an embodiment of a system for prioritizing network traffic using deep packet inspection (DPI)

FIG. 1 illustrates an embodiment of a system for prioritizing network traffic using deep packet inspection (DPI). The system 100 includes a sender device 110 coupled to an intermediate network node 120 within a network 130. In an example embodiment of the invention, the network 130 is a packet based network In at least one embodiment, the intermediate network node is a network controller. The intermediate network node 120 is further coupled to a receiver device 150. In an example embodiment, the sender device 110 includes a server and the receiver device 150 includes a user terminal used to retrieve data from the server. For example, the sender device 110 may include a media server that sends audio and/or video data to the receiver device 150 upon request. The intermediate network node 120 further includes a deep packet inspection (DPI) module 140. In a particular embodiment, the DPI module 140 includes at least one processor for executing instructions operable to perform the various operations of the DPI module 140 described herein. The DPI module 140 identifies one or more packets, such as internet protocol (IP) packets, as they traverse through the network 130 using deep packet inspection (DPI) techniques to produce deep packet inspection (DPI) information. The DPI information includes traffic priority information associated with the one or more packets. In at least one embodiment, the DPI information includes information that may be used by various network nodes, such as the sender device 110, the receiver device 150, and one or more network controllers, to prioritize traffic associated with the packets.

In at least one embodiment, the DPI module 140 may inject the DPI information into one or more acknowledgment packets flowing from the receiver device 150 to the sender device 110. Upon receiving the acknowledgment packet, the sender device 110 controls the traffic flowing from the sender device 110 to the receiver device 150 according to the DPI information included in the acknowledgement packet. In some embodiments, the DPI information is also passed to the receiver device 150 in acknowledgment packets flowing from the sender device 110 to the receiver device 150. In still other embodiments, the DPI information is also passed to one or more network controllers that prioritize the traffic according to the DPI information. In various embodiments, the DPI information is inserted into a specific field within a Transport Control Protocol (TCP) acknowledgment packet.

The Transmission Control Protocol (TCP) is one of the core protocols of the internet protocol suite, often simply referred to as TCP/IP. Using TCP, applications on networked hosts can create connections to one another, over which they can exchange streams of data using stream sockets. The protocol allows reliable and in-order delivery of data from a sender to a receiver. TCP also provides for distinguishing data for multiple connections by concurrent applications (e.g., a Web server and an e-mail server) running on the same host. TCP supports many of the Internet's most popular application protocols and resulting applications, including the World Wide Web, e-mail, File Transfer Protocol and Secure Shell.

In the Internet protocol suite, TCP is the intermediate layer between the Internet Protocol (IP) layer and an application layer. Applications often need reliable pipe-like connections to each other, whereas the Internet Protocol does not provide such streams, but rather only best effort delivery. As a result, delivery of the packets is unreliable. TCP was designed to work in a packet store-and-forward environment characterized by the possibility of packet loss, packet disordering, and packet duplication. Packet loss can occur, for example, by a congested network element discarding a packet. Packet disordering can occur, for example, by packets of a TCP connection being arbitrarily transmitted partially over a low bandwidth terrestrial path and partially over a high bandwidth satellite path. Packet duplication can occur, for example, when two directly-connected network elements use a reliable link protocol and the link goes down after the receiver correctly receives a packet, but before the transmitter receives an acknowledgement for the packet.

TCP performs the task of the transport layer in the simplified OSI model of computer networks. Typically, applications send streams of octets (8-bit bytes) to TCP for delivery through the network, and TCP divides the byte stream into appropriately sized segments, usually delineated by the maximum transmission unit (MTU) size of the data link layer of the network to which the computer is attached. TCP then passes the resulting packets to the Internet Protocol, for delivery through a network to the TCP module of the entity at the other end. TCP checks to make sure that no packets are lost by giving each packet a sequence number, which is also used to make sure that the data is delivered to the entity at the other end in the correct order. The TCP module at the far end sends back an acknowledgement for packets that have been successfully received. A timer at the sending TCP will cause a timeout if an acknowledgement is not received within a reasonable round-trip time (or RTI), and the (presumably) lost data will then be retransmitted. The TCP checks that no bytes are corrupted by using a checksum that is computed at the sender for each block of data before it is sent, and then checked at the receiver to ensure correct reception.

Example TCP Header fields are given below:

| Field | Function |
| --- | --- |
| Source Port | TCP port of the transmitting machine. |
| Destination Port | TCP port of the target machine, delivery address for the communication. |
| Sequence Number | Sequence number for the segment, used to reassemble the data and to ensure all bytes have been received. |
| Acknowledgment Number | The sequence number of the next byte the machine expects to receive. |
| Data Length | The size of the TCP segment. |
| Reserved | Reserved for future use. |
| Flags | Indicates type of information in the segment. |
| Window | Indicates type of information in the segment. |
| Checksum | Verifies that the header is not corrupt. |
| Urgent Pointer | If urgent data is being transmitted, it will be indicated in the Flags field. The pointer points to the end of the urgent data in the segment. |

With deep packet inspection (DPI), signatures are used to identify specific network applications and protocols in use over a network In their most broad sense, signatures are pattern recipes which are chosen to uniquely identify an associated application or protocol. When a new application or protocol is encountered, the data packets of the new application are analyzed and an appropriate signature is developed and added to a database, typically referred to as a signature library. In an embodiment of the invention, packets transmitted by a particular application or protocol are received, and the packets are analyzed using deep packet inspection to generate a signature. The signature is then compared to entries in the signature library, and if a match is found, the data packets are identified as being associated with the particular application or protocol.

Application signatures should be checked on a regular basis as they tend to vary as new application updates or protocol revisions occur. For example, peer-to-peer file sharing applications tend to upgrade their client software on a regular basis and encourage, and, in some cases, even force users to move on to the new release. The use of these new releases with non-up-to-date signatures will affect classification performance.

Although a signature is developed with the intention to uniquely and completely identify its related application or protocol, there are cases in which the signature is not robust (a.k.a. weak signature) and classification problems arise. False positives is the basic terminology referring to misclassification, or in simple terms, the likelihood that an application will be identified as something it is not. If DPI is being used for guiding a subscriber management tool, this may lead to wrongful actions. A typical example of such a wrongful action could be the mistaken lowering of priorities to time-sensitive streaming traffic and the resultant introduction of unwanted latency or even packet loss. Consequently, when developing signatures, every effort should be made to achieve a low percentage of false positives. A common way to strengthen a weak signature is to use a combination of more than one pattern. False negatives refers to those cases where it is not possible to consistently identify an application—sometimes the identification is classified, while other times it is missed by the classification tool. The most common reason for this phenomenon is that some applications can accomplish similar outcomes in several ways in different deployment scenarios. For example, some applications will behave differently if the client software operates through a proxy or firewall compared to a simpler case in which the client interacts with the web directly.

Several analysis techniques are used in deep packet inspection (DPI) to identify and classify traffic to generate a signature. These range from analysis by port, by string match, by numerical properties, by behavior and heuristics. Analysis by port is probably the easiest and most well known form of signature analysis because many applications use either default ports or some chosen ports in a specific manner. A good example is Post Office Protocol version 3 (POP3) used for email applications. An incoming POP3 connection typically uses port 110, and if it is a secure connection, it will use port 995. The outgoing SMTP is port 25. However, since it is very easy to detect application activity by port, this is in fact a weakness, particularly because many current applications disguise themselves as other applications. The most notorious example is the Port 80 syndrome, where many applications camouflage as pure HTTP traffic. Some applications select random ports instead of using fixed default ports. In this case, there is often some pattern involved in the port selection process, for example, the first port may be random, but the next will be the subsequent one, and so forth. However, in some cases the port selection process maybe completely random. For all these reasons, it is often not feasible to use analysis by port as the only tool for identifying applications, but rather as a form of analysis to be used together with other tools.

Analysis by string match involves searching for a sequence (or string) of textual characters or numeric values within the contents of a packet. Furthermore, string matches may include several strings distributed within a packet or several packets. For example, many applications still declare their names within the protocol itself, as in Kazaa, where the string "Kazaa" can be found in the User-Agent field with a typical HTTP GET request. From this example, it is possible to understand the importance of DPI for correct classification. If analysis is performed by port analysis alone, then port 80 may indicate HTTP traffic and the GET request will further corroborate this observation. If the User-Agent field information is missing, this analysis will result in inaccurate classification (i.e., HTTP and not Kazaa).

Analysis by numerical properties involves the investigation of arithmetic characteristics within a packet or several packets. Examples of properties analyzed include payload length, the number of packets sent in response to a specific transaction, and the numerical offset of some fixed string (or byte) value within a packet. For example, consider the process for establishing a TCP connection using some user datagram protocol (UDP) transactions in Skype (versions prior to 2.0). The client sends an 18 byte message, expecting in return an 11 byte response. This is followed by the sending of a 23 byte message, expecting a response which is 18, 51 or 53 bytes. Using numerical analysis combined with other techniques of deep packet inspection, such a pattern can be detected and the particular application can be identified.

In accordance with various embodiments, the DPI module 140 in the intermediate network node 120 uses deep packet inspection, including some or all the above described analysis techniques to identify and classify traffic to obtain deep packet inspection (DPI) information. In accordance with various embodiments, the DPI information is forwarded to the sender device 110 within an acknowledgment packet sent from the receiver device 150 to the sender device 110. The DPI information is received by the sender device 110 and applied appropriately by the sender device 110 to control and prioritize the IP traffic flowing between the sender device 110 and the receiver device 150. In still other embodiments, the DPI information is also forwarded to one or more of the receiver device 150 and a network controller to control and prioritize the traffic properly.

According to a particular embodiment, the DPI information comprises a one-byte DPI inspection code that is inserted at the intermediate network node 120 by the DPI module 140 into one or more acknowledgment packets, such as a synchronization acknowledgement (SYNC ACK) or data acknowledgement (DATA ACK) packet, sent from the receiver device 150 to the sender device 110. The DPI inspection code instructs the sender device 110 on the manner in which the packet and other traffic is to be handled for traffic control purposes. An example DPI inspection code includes a '1' representing the stopping of sending packets, a '2' representing the slowing down of packets, a '3' representing the rerouting of traffic, a '4' representing the stopping of billing for traffic, a '9' representing the continuation of sending of traffic, an 'A' representing the pausing of the traffic, and a 'Z' representing the prioritizing of the traffic. Alternative codes may be utilized in accordance with the principles of the present invention.

Figure 2A:
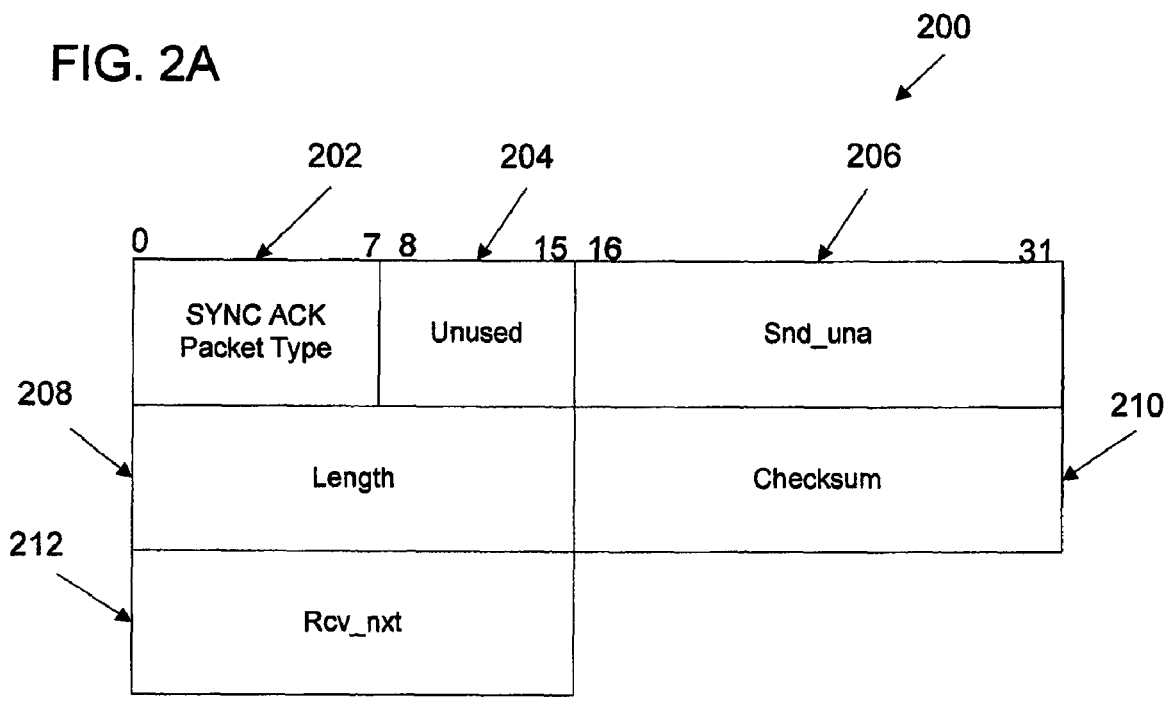
FIG. 2A illustrates an embodiment of a synchronization acknowledgement packet.

FIG. 2A illustrates an embodiment of a synchronization acknowledgement (SYNC ACK) packet 200. The synchronization acknowledgement packet 200 controls synchronization between hosts, such as between a host associated with the sender device 110 and a host associated with the receiver device 150. The synchronization acknowledgement packet 200 includes a synchronization acknowledgment (SYNC ACK) packet type identifier portion 202, an unused portion 204, a snd_una portion 206, a length portion 208, a checksum portion 210, and a rcv_nxt portion 212. The SYNC ACK packet type identifier portion 202 includes an 8-bit identifier that identifies the packet 200 as a synchronization acknowledgement packet. In a particular embodiment, an identifier of '00000001' is used to indicate a SYNC ACK packet type. The unused portion 204 is an 8-bit field that is unused in a synchronization acknowledgement packet. The snd_una portion 206 is a 16-bit field that indicates the first unacknowledged sequence number. The length portion 208 is a 16-bit field that indicates the number of octets in the synchronization acknowledgement packet 200 including a header and data. In the particular embodiment illustrated by FIG. 2A, the length portion 208 indicates that the synchronization acknowledgement packet 200 includes 10 octets. The checksum portion 210 is a 16-bit checksum field. The rcv_nxt portion 212 is a 16-bit field that indicates the expected next receive sequence number. In a particular embodiment, the DPI code is inserted into the unused portion 204 of the synchronization acknowledgement packet 200 so that DPI information can be provided to the sender device 110 to be used for traffic control. In still other embodiments, the DPI information may be provided to the receiver device 150 and one or more intermediate nodes in the synchronization acknowledgement packet 200.

Figure 2B:
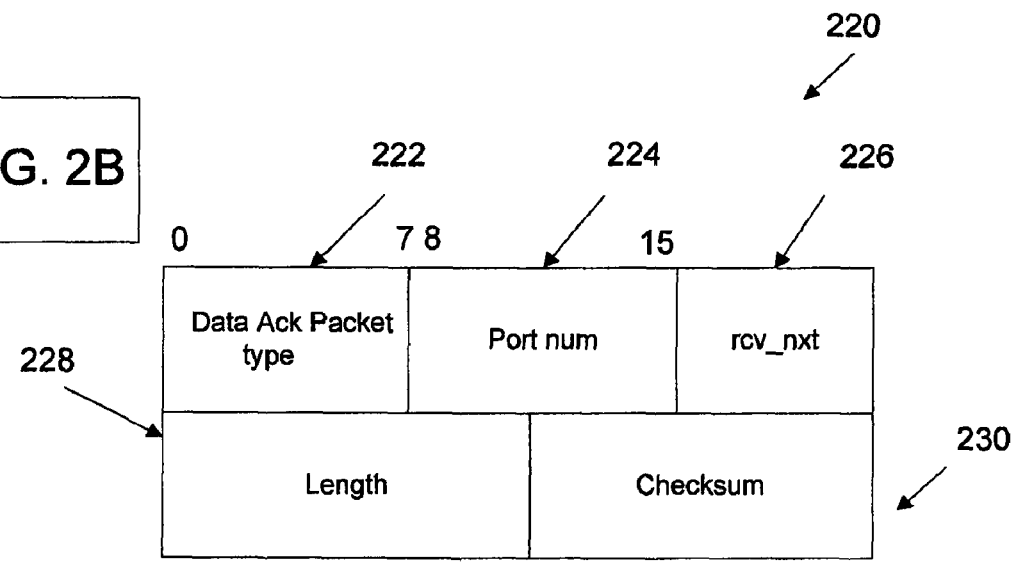
FIG. 2B illustrates an embodiment of a data acknowledgement packet.

FIG. 2B illustrates an embodiment of a data acknowledgement (DATA ACK) packet 220. The data acknowledgement packet 220 is transmitted from the receiver device 150 to the sender device 110 to provide confirmation that a data packet transmitted from the sender device 110 to the receiver device 150 has been received. The data acknowledgement packet 220 includes a data acknowledgment (DATA ACK) packet type identifier portion 222, a port number portion 224, a rcv_nxt portion 226, a length portion 228, and a checksum portion 230. The DATA ACK packet type identifier portion 222 includes an 8-bit identifier that identifies the packet 220 as a data acknowledgement packet. In a particular embodiment, an identifier of '00000011' is used to indicate a DATA ACK packet type. The port number portion 224 is an 8-bit field that is used to indicate a port number of a process in a connection having multiple processes. The rcv_nxt portion 226 is a 16-bit field that indicates the expected next receive sequence number. The length portion 228 is a 16-bit field that indicates the number of octets in the data acknowledgement packet 220 including a header and data. In the particular embodiment illustrated by FIG. 2B, the length portion 208 indicates that the data acknowledgement packet 200 includes 8 octets. The checksum portion 230 is a 16-bit checksum field. In a particular embodiment, the DPI code is inserted into an unused portion of the data acknowledgement packet 220 so that DPI information can be provided to the sender device 110 to be used for traffic control. For example, the DPI code may be inserted into the port number portion 224 in situations where the port number portion 224 is not in use. In still other embodiments, the DPI information may be provided to the receiver device and one or more intermediate nodes in the data acknowledgement packet 220.

FIG. 3 illustrates an embodiment of a procedure for prioritizing network traffic using deep packet inspection (DPI). The procedure 300 begins in step 305. In step 310, a packet sent from the sender device 110, and addressed to the receiver device 150, is received at the intermediate network node 120.

In step 315 the packet is identified at the network layer by the DPI module 140 using deep packet inspection, such as by using one or more of the techniques for deep packet inspection described herein. Identification of the packet by deep packet inspection allows the DPI module 140 to determine the identify of one or more of a particular application and protocol that the sender device 110 and the receiver device 150 are using to communicate with one another, and generate DPI information in the form of a DPI inspection code based on the identification. The DPI inspection code includes traffic priority information that indicates how traffic between the sender device 110 and the receiver device 150 is to be prioritized.

In step 320, DPI inspection code and packet information is passed by the DPI module 140 from the network layer to the transport layer. The technology for injecting information from one layer to another layer of the OSI model exists, as understood in the art. In step 325, the packet is further identified and the TCP header is examined at the transport layer. In step 330, the intermediate network node 120 forwards the packet to the receiver device 150. In step 335, an acknowledgment packet is received from the receiver device 150 at the intermediate network node 120. In step 340, the DPI module 140 inserts the DPI inspection code into the acknowledgment packet. In a particular embodiment of the invention, the DPI module 140 inserts the DPI inspection code into an unused portion of the acknowledgment packet. In step 345, the intermediate network node 120 forwards the acknowledgment packet to the sender device 110. In step 350, the sender device 110 receives the acknowledgment packet and reads the DPI inspection code from the acknowledgment packet. In step 355, traffic between the sender device 110 and the receiver device 150 is prioritized according to the DPI code information contained within the acknowledgment packet. In step 360, the procedure 300 ends.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link This communication link may use a medium that is, for example without limitation, physical or wireless.

The previous detailed description is of a small number of embodiments for implementing the invention and is not intended to be limiting in scope. One of skill in this art will immediately envisage the methods and variations used to implement this invention in other areas than those described in detail. For example, although the described embodiments are directed to deep packet inspection and modification of acknowledgement packets being performed at an intermediate network node, it should be understood that these procedures may be performed at any node within the network Although some particular embodiments are described with respect to using a TCP transport layer, it should be understood that the principles described herein may be used with any transport layer connection regardless of the particular network configuration or technologies used. The following claims set forth a number of the embodiments of the invention disclosed with greater particularity.

What is claimed as new and desired to be protected by Letters Patent of the United States is:

1. A method for prioritizing network traffic comprising:
   receiving a packet from a sender device, the packet addressed to a receiver device;
   performing a deep packet inspection of the packet at a network layer to collect data that identifies at least one of an application or protocol associated with the packet;
   generating a signature from the data that identifies the at least one of an application or protocol;
   comparing the signature to entries in a signature library;
   identifying that the data packet is associated with a particular application or protocol if a match of the signature to an entry in the signature is found;
   updating the signature library with the signature if a match of the signature to an entry in the signature library is not found;
   generating traffic priority information associated with the packet based upon the identifying, the traffic priority information indicating traffic prioritization between the sender device and the receiver device;
   forwarding the packet to the receiver device;
   receiving an acknowledgment packet from the receiving device; and
   inserting the traffic priority information into the acknowledgment packet at a transport layer.

2. The method of claim 1, further comprising:
   forwarding the acknowledgment packet to the sender device;
   receiving the acknowledgement packet at the sender device; and
   prioritizing traffic between the sender device and the receiver device in accordance with the traffic priority information.

3. The method of claim 1, wherein identifying the packet at the network layer includes identifying the packet at the network layer using deep packet inspection.

4. The method of claim 1, wherein the acknowledgment packet includes a synchronization acknowledgment packet.

5. The method of claim 1, wherein the acknowledgement packet includes a data acknowledgment packet.

6. The method of claim 1, wherein the acknowledgment packet includes a transport layer acknowledgment packet.

7. The method of claim 1, wherein the priority information includes a deep packet inspection code.

8. An apparatus for prioritizing network traffic comprising:
   at least one processor, the at least one processor configured to:
      receive a packet from a sender device, the packet addressed to a receiver device;
      perform a deep packet inspection of the packet at a network layer to collect data that identifies at least one of an application or protocol associated with the packet;
      generate a signature from the data that identifies the at least one of an application or protocol;
      compare the signature to entries in a signature library;
      identify that the data packet is associated with a particular application or protocol if a match of the signature to an entry in the signature is found;
      update the signature library with the signature if a match of the signature to an entry in the signature library is not found;
      generate traffic priority information associated with the packet based upon the identifying, the traffic priority information indicating traffic prioritization between the sender device and the receiver device;
      forward the packet to the receiver device;
      receive an acknowledgment packet from the receiving device; and
      insert the traffic priority information into the acknowledgment packet at a transport layer.

9. The apparatus of claim 8, wherein the at least one processor is further configured to:
   forward the acknowledgment packet to the sender device.

10. The apparatus of claim 9, wherein the sender device is operable to:
    receive the acknowledgement packet; and
    prioritize traffic between the sender device and the receiver device in accordance with the traffic priority information.

11. The apparatus of claim 8, wherein identifying the packet at the network layer includes identifying the packet at the network layer using deep packet inspection.

12. The apparatus of claim 8, wherein the acknowledgment packet includes a synchronization acknowledgment packet.

13. The apparatus of claim 8, wherein the acknowledgement packet includes a data acknowledgment packet.

14. The apparatus of claim 8, wherein the acknowledgment packet includes a transport layer acknowledgment packet.

15. The apparatus of claim 8, wherein the priority information includes a deep packet inspection code.

16. A computer usable program product in a non-transitory computer readable storage medium storing computer executable instructions for prioritizing network traffic that, when executed, cause at least one processor to:
    receive a packet from a sender device, the packet addressed to a receiver device;
    perform a deep packet inspection of the packet at a network layer to collect data that identifies at least one of an application or protocol associated with the packet;
    generate a signature from the data that identifies the at least one of an application or protocol;
    compare the signature to entries in a signature library;
    identify, that the data packet is associated with a particular application or protocol if a match of the signature to an entry in the signature is found;
    update the signature library, with the signature if a match of the signature to an entry in the signature library, is not found;
    generate priority information associated with the packet based upon the identifying, the traffic priority information indicating traffic prioritization between the sender device and the receiver device;
    forward the packet to the receiver device;
    receive an acknowledgment packet from the receiving device;

insert the traffic priority information into the acknowledgment packet at a transport layer.

17. The computer usable program product of claim 16, wherein the computer usable program product is further operable to cause the at least one processor to:

forward the acknowledgment packet to the sender device.

18. The computer usable program product of claim 17, wherein the sender device is configured to:

receive the acknowledgement packet; and prioritize traffic between the sender device and the receiver device in accordance with the traffic priority information.

19. The computer usable program product of claim 16, wherein identifying the packet at the network layer includes identifying the packet at the network layer using deep packet inspection.

20. The computer usable program product of claim 16, wherein the acknowledgment packet includes a transport layer acknowledgment packet.

* * * * *